(12) United States Patent
Lee

(10) Patent No.: US 6,796,220 B2
(45) Date of Patent: Sep. 28, 2004

(54) AUTOMATIC BEAN CURD MANUFACTURING APPARATUS

(76) Inventor: Jane Lee, 104-802, Jugong Apt., Changhyeon-Ri, Hwado-Eup, Namyangju-Si (KR), 472-848

( * ) Notice: Subject to any disclaimer, the term of this patent is extended or adjusted under 35 U.S.C. 154(b) by 0 days.

(21) Appl. No.: 10/762,422

(22) Filed: Jan. 22, 2004

(65) Prior Publication Data

US 2004/0149148 A1 Aug. 5, 2004

(30) Foreign Application Priority Data

Jan. 22, 2003 (KR) ............................... 20-2003-0003659

(51) Int. Cl.[7] .......................... A23L 1/00; A23L 1/20; A23C 3/02; A47J 43/044; B01F 7/20
(52) U.S. Cl. ........................ 99/348; 99/281; 99/285; 99/286; 99/288; 99/337; 99/452; 99/453; 99/483; 99/510; 99/513; 366/146; 366/249; 366/251
(58) Field of Search ..................... 99/331, 341, 348, 99/352–355, 452–460, 468, 483, 485, 495, 509–513, 279–281, 275, 283, 285, 286, 288, 290, 300, 323.3; 426/43–46, 50, 52, 61, 656, 431, 520, 598; 210/346, 511, 514, 694, 780, 793; 366/279, 144–146, 249–251; 340/618–622; 241/37.5, 92, 101.01

(56) References Cited

U.S. PATENT DOCUMENTS

| | | | | |
|---|---|---|---|---|
| 4,534,283 A | * | 8/1985 | Nakamuta | ..................... 99/468 |
| 4,817,516 A | * | 4/1989 | Chikarashi | ................... 99/483 |
| 5,249,513 A | * | 10/1993 | Ueda | ........................... 99/453 |
| 5,363,753 A | * | 11/1994 | Ueda et al. | ................... 99/453 |
| 5,701,810 A | * | 12/1997 | Nakai | .......................... 99/495 |
| 5,852,965 A | * | 12/1998 | Kim | ............................ 99/281 |
| 6,247,393 B1 | * | 6/2001 | Chang | ......................... 99/348 |
| 6,345,572 B1 | * | 2/2002 | Kao | ............................ 99/337 |
| 6,653,941 B2 | * | 11/2003 | Kim | .......................... 340/620 |

* cited by examiner

Primary Examiner—Timothy F. Simone
(74) Attorney, Agent, or Firm—Keusey, Tutunjian & Bitetto, P.C.

(57) ABSTRACT

An automatic bean curd manufacturing apparatus includes a main body provided with a bean grinding chamber and a bean juice heating chamber, a driving motor installed in the main body, a rotational container removably and rotatably installed in the grinding chamber of the main body and provided at an inner bottom with a grinding blade, a rotation suppressing member for selectively suppressing a rotation of the rotational container, a clutch installed on a bottom of the rotational container to rotatably support the grinding blade, a rotational container cover for closing an opened top of the rotational container, a grinding container removably installed in the rotational container to grind the beans, a rotational container fixing member for preventing the rotational container from moving, a heating container removably installed in the heating chamber to heat the bean juice dispensed from the rotational container through a bean juice guide, and a heating container cover for closing an opened top of the heating container.

20 Claims, 10 Drawing Sheets

AUTOMATIC BEAN CURD MANUFACTURING APPARATUS

BACKGROUND OF THE INVENTION

1. Field of the Invention

The present invention relates to an automatic bean curd manufacturing apparatus that is designed in order for a user to easily make bean curd at home, and more particularly, to an automatic bean curd manufacturing apparatus that can automatically perform an extracting process for extracting a bean juice by grinding beans as well as a heating process for making soymilk by heating the bean juice.

2. Description of the Related Art

Generally, a bean curd is a kind of foodstuff that is made by steps of soaking beans in the water, making a bean juice by grinding the beans, heating the bean juice, removing bean curd residues from the bean juice, and adding coagulant to the bean juice. As the bean curd is a vegetable protein-rich food, it is most popular among the bean foodstuffs.

Describing the bean curd manufacturing process in greater detail, beans are first well washed and soaked in the water. Then, the soaked beans are ground while adding water little by little to be changed into bean curd residue. The bean curd residue is directly boiled in a kettle or heated by steam so that a bloody smell can be eliminated from the bean curd residue and the protein can be dissolved in the water.

Afterwards, the bean curd residue is squeezed using a hemp cloth so that the bean curd residue can be separated into soymilk and residues. At this point, when the bean curd residue gets cold, since it is difficult to squeeze the soymilk out of the same, it is preferable to squeeze the soymilk out when the bean curd residue is hot.

When the soymilk gets cold down to a temperature of 70° C., a coagulant, a chief ingredient of which is magnesium chloride or calcium sulfate, is added to the soymilk to solidify the protein of the soymilk, after which the solidified stuff is disposed in a box in which a cotton cloth is spread out. Then, after a lid is disposed on the box, a stone is disposed on the lid to depress the solidified stuff so that the residual water can be drained through small holes formed on the box.

The box and the cotton cloth are removed from the bean curd in a state where the box with the bean curd is soaked in cold water. The bean curd removed from the box is soaked in the water for a predetermined time to remove the coagulant, whereby a delicious bean curd can be obtained.

A series of the above-described processes has been manually performed. Alternatively, the processes have been performed by a variety of separated apparatuses for each process.

That is, the bean juice extracting process and the soymilk making process have been independently performed by separated apparatuses. Therefore, it is difficult for a user to efficiently make a small amount of the bean curd at home. In addition, the separated apparatuses for each process cause the increase of the costs.

Accordingly, the consumers cannot make the bean curd by themselves at home, but have to buy the same that is mass-produced in factories. It would be advantageous for consumers to be able to produce bean curd to prevent a deterioration of freshness due to the delivery time.

SUMMARY OF THE INVENTION

Accordingly, the present invention is directed to an automatic bean curd manufacturing apparatus that substantially obviates one or more problems due to limitations and disadvantages of the related art.

An object of the present invention is to provide an automatic bean curd manufacturing apparatus that is designed in order for a user to easily make bean curd at home by automatically and consecutively performing an extracting process for extracting a bean juice by grinding beans and a heating process for making soymilk by heating the bean juice.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an automatic bean curd manufacturing apparatus comprising a main body provided with a bean grinding chamber and a bean juice heating chamber; a driving motor installed in the main body; a rotational container removably and rotatably installed in the grinding chamber of the main body and provided at an inner bottom with a grinding blade; rotation suppressing means for selectively suppressing a rotation of the rotational container, the rotation suppressing means being installed in the grinding chamber; a clutch installed on a bottom of the rotational container to rotatably support the grinding blade, the clutch allowing only the grinding blade to rotate when the rotation of the rotational container is suppressed by the rotation suppressing means and allowing both the rotational container and the grinding blade to simultaneously rotate when the rotation of the rotational container is not suppressed by the rotation suppressing means; a rotational container cover for closing an opened top of the rotational container; a grinding container removably installed in the rotational container to grind the beans, the grinding blade installed on the bottom of the rotational container being located in the grinding container; rotational container fixing means for preventing the rotational container from seceding while rotatably supporting the rotational container, the rotational container fixing means being installed on an entrance of the grinding chamber of the main body; a heating container removably installed in the heating chamber to heat the bean juice dispensed from the rotational container through a bean juice guide; and a heating container cover for closing an opened top of the heating container.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
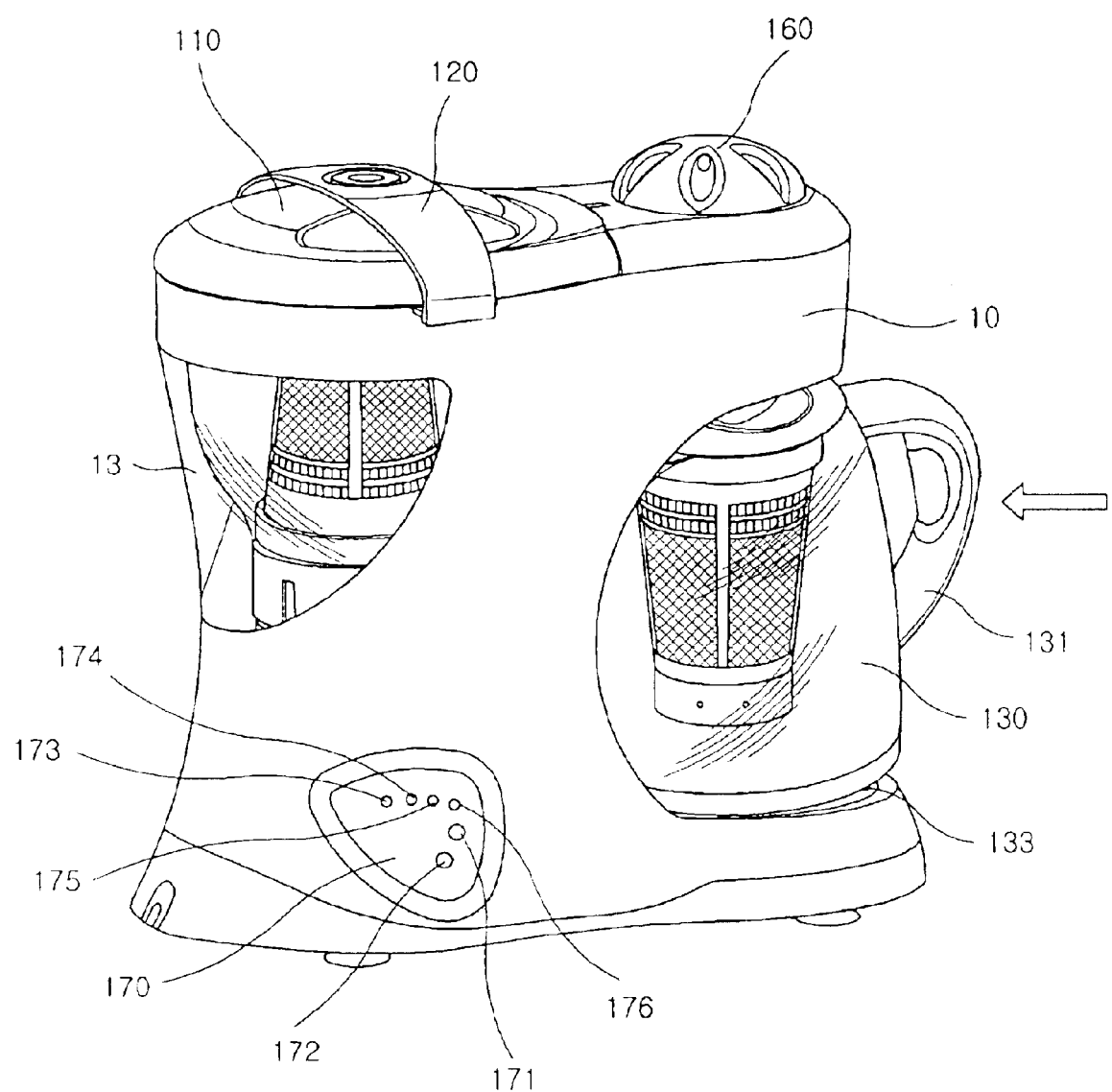
FIG. 1 is a perspective view of an automatic bean curd manufacturing apparatus according to a preferred embodiment of the present invention.
Figure 2:
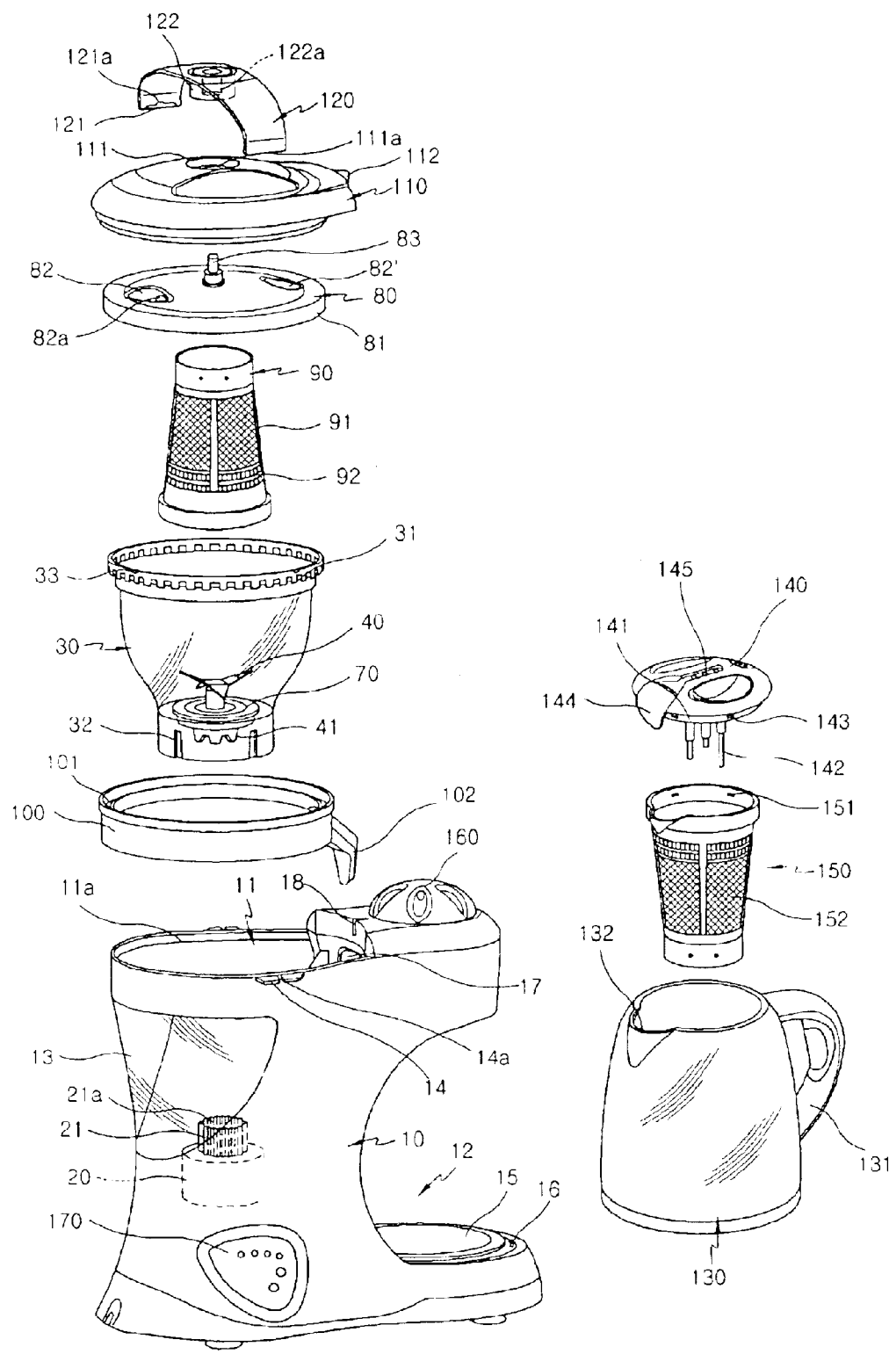
FIG. 2 is an exploded perspective view of an automatic bean curd manufacturing apparatus according to a preferred embodiment of the present invention.

Referring first to FIGS. 1 and 2, there is shown an automatic bean curd manufacturing apparatus according to a preferred embodiment of the present invention.

As shown in the drawings, the inventive automatic bean curd manufacturing apparatus comprises a main body 10 provided with a bean grinding chamber 11 and a bean juice heating chamber 12, a driving motor 20 installed in the main body 10, a rotational container 30 removably and rotatably installed in the grinding chamber 11 of the main body and provided at an inner bottom with a grinding blade 40, rotation suppressing means (e.g., 50 and 51) for selectively suppressing the rotation of the rotational container 30, the rotation suppressing means being installed in the grinding chamber 11, a clutch 70 installed on a bottom of the rotational container 30 to rotatably support the grinding blade 40, a rotational container cover 80 for closing an opened top of the rotational container 30, a grinding container 90 removably installed in the rotational container 30 to grind the beans, a bean juice guide 100 for guiding the dispense of the bean juice, rotational container fixing means (e.g., 110 and 120) for preventing the rotational container 30 from moving while rotatably supporting the rotational container 30, the rotational container fixing means being installed on an entrance of the grinding chamber 11 of the main body 10, a heating container 130 removably installed in the heating chamber 12 to heat the bean juice dispensed from the grinding chamber 11 through the bean juice guide, a heating container cover 140 for closing an opened top of the heating container 130, a filtering container 150 for filtering out residues contained in the bean juice dispensed from the heating container 130, an operation start handle 160 for locking the heating container 130 inserted in the heating chamber 11 of the main body 10, and a control panel 170 for controlling each device.

Figure 9:
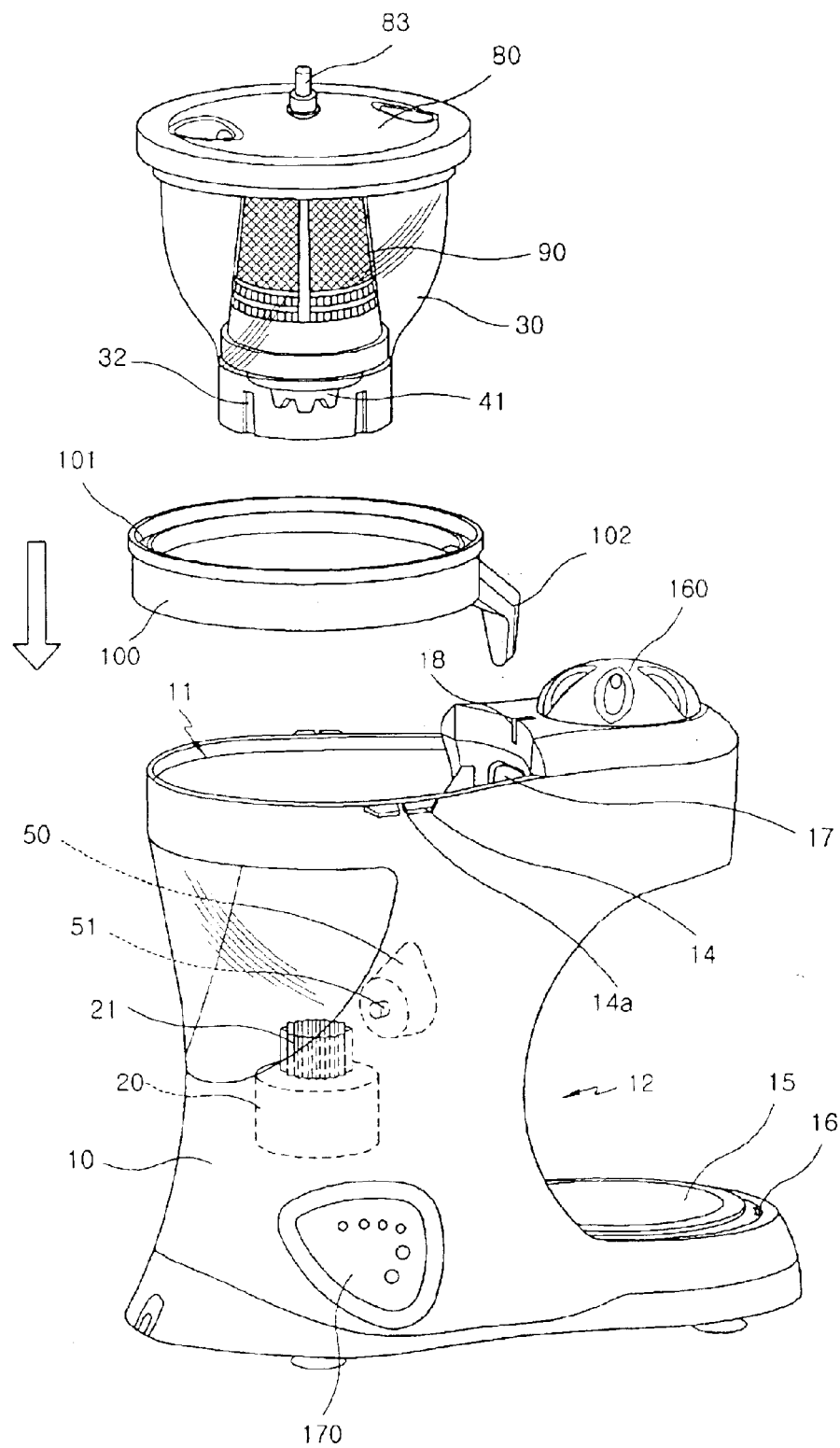
FIG. 9 is a perspective view illustrating an assembling process of a bean juice guide and a rotational guide with a main body according to the present invention.

As shown in FIGS. 2 and 9, a portion of the main body 10 defines the grinding chamber 11 in which a bean juice is obtained by grinding beans together with water and the other portion of the main body 10 defines the heating chamber 12 in which the bean juice is heated.

The grinding chamber 11 is designed having an opened top so that the rotational container 30 can be installed and removed through the opened top. The grinding chamber 11 is provided with a transparent window 13 through which a user can identify an install state of the rotational container 30, a grinding process of beans, and a dispensing state of the bean juice.

The grinding chamber 11 is provided at an upper-inner circumference with a guide seat 11a on which the bean juice guide 100 is seated and at opposite sides of the opened top with hook members 14 for fixing opposite ends of a fixing member 120. A hook groove 14a is formed on a middle portion of the hook member 14. Meanwhile, the heating chamber 12 is designed having an opened side so that the heating container 130 can be installed and removed through the opened side. A heating plate 15 is installed on a bottom of the heating chamber 12 to apply heat to the heating container 130. A heater (not shown) is installed under the heating plate 15 in the main body 10.

A plurality of secession preventing grooves 16 are formed on a bottom of the heating chamber 12 around the heating plate 15 to prevent the heating container 130 seated on the heating plate 15 from seceding or from being moved off the heating plate 15.

A dispensing through hole 17 communicating with a bean juice exhausting channel 102 of the bean juice guide 100 is formed between the grinding chamber 11 and the heating chamber 12.

The driving motor 20 functions to rotate the grinding blade 40 and the rotational container 30 installed in the grinding chamber 11 of the main body 10. A driving shaft (not shown) of the driving motor 20 penetrates a bottom of the grinding chamber 11, being projected into the grinding chamber 11. Mounted on the driving shaft is a first coupling 21 to which the grinding blade 40 is removably coupled.

The first coupling 21 is provided with a coupling groove 21a in which a second coupling 41 of the grinding blade 40 is removably coupled.

Referring to FIGS. 2 and 6 to 9, the rotational container 30 is rotatably and removably installed in the grinding chamber 11 of the main body 10. The rotational container 30 is formed of a transparent material and is formed in a funnel shape, a diameter of which is reduced as it goes downwards. The grinding blade 40 is installed on the inner bottom of the rotational container 30 to grind the beans supplied.

The grinding blade 40 is rotatably supported on a central portion of a clutch 70 installed on the bottom of the rotational container 30. The second coupling 41 coupled to the first coupling 21 mounted on the driving shaft of the driving motor 20 is mounted on a bottom of the grinding blade 40.

A plurality of bean juice exhaust holes 31 is formed on an upper portion of the rotational container 30 so as to externally dispense the bean juice ascended by centrifugal force generated when the rotational container 30 rotates. A plurality of operation shaft insertion grooves 32, in which an operation shaft 51 of the rotation suppressing means 50 and 51 (FIG. 9) is inserted to suppress the rotation of the rotational shaft 30, are formed on a lower portion of an outer circumference of the rotational container 30.

Formed on an upper portion of the outer circumference of the rotational container 30 are a plurality of coupling projections 33 with which the rotational container cover 80 is removably engaged.

As shown in FIG. 9, the rotation suppressing means comprises a solenoid 50 for selectively suppressing the rotation of the rotational container 30.

The solenoid 50 is controlled by a control circuit 60 (FIG. 5) installed in the main body 10 such that, in the course of grinding, the operation shaft 51 is projected out of the solenoid 50 to be inserted into the operation shaft insertion groove 32 of the rotational container 30, thereby suppressing the rotation of the rotational container 30. When the grinding process is completed, the solenoid 50 is controlled such that the operation shaft 51 is released from: the operation shaft insertion groove 32 and is inserted into the solenoid 50 to allow the rotational container 30 to rotate.

As shown in FIG. 2, the clutch 70 is installed on the bottom of the rotational container 30 to rotatably support the grinding blade 40. That is, the clutch 70 is designed to allow only the grinding blade 40 to rotate when the rotation of the rotational container 30 is suppressed by the solenoid 50. When the rotation of the rotational container 30 is not suppressed, the clutch 70 is designed to allow both the rotational container 30 and the grinding blade 40 to simultaneously rotate.

That is, when the rotation of the rotational container 30 is suppressed by the solenoid 50, the grinding blade 40 rotates while overcoming frictional force. When the rotation of the rotational container 30 is not suppressed by the solenoid 50, since the grinding blade 40 cannot overcome the frictional force between the grinding blade 40 and the clutch 70, both the grinding blade 40 and the rotational container 30 simultaneously rotate.

As shown in FIGS. 2 and 8–10, the rotational container cover 80 is provided to close the opened top of the rotational container 30. That is, the cover 80 is provided with a fixing flange 81 fixed on the opened top of the rotational container 30 while enclosing the same. Formed on an inner circumference of the fixing flange 81 are coupling grooves (not shown) in which the coupling projections 33 formed on the upper portion of the outer circumference of the rotational container 30 are inserted.

Grasping grooves 82 and 82' spaced away from each other are formed on a top of the cover 80 so that the user can grasp and rotate the cover 80 to allow the coupling projections 33 to be inserted into the coupling grooves. The grasping grooves 82 and 82' are respectively provided with water supply holes 82a and 82a' through which the water is supplied into the rotational container 30.

Coupled on the top center of the cover 80 is a rotational pin 83 defining a rotational center to allow the rotational container 30 and the cover 80 to effectively rotate. The rotational pin 83 is rotatably supported by rotational shaft fixing means.

Figure 6:
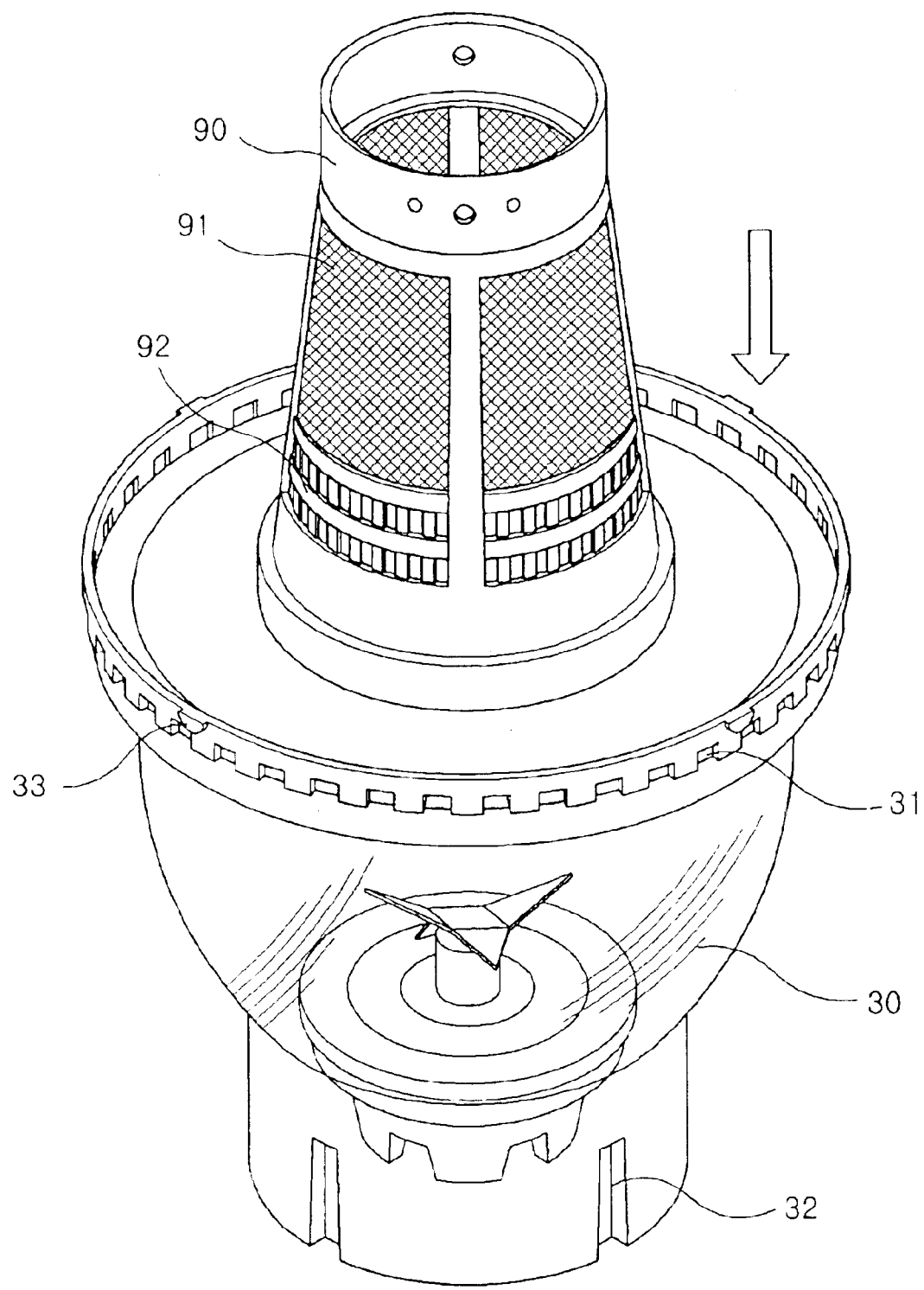
FIG. 6 is a perspective view illustrating an assembling process of a rotational container with a grinding container according to the present invention.
Figure 7:
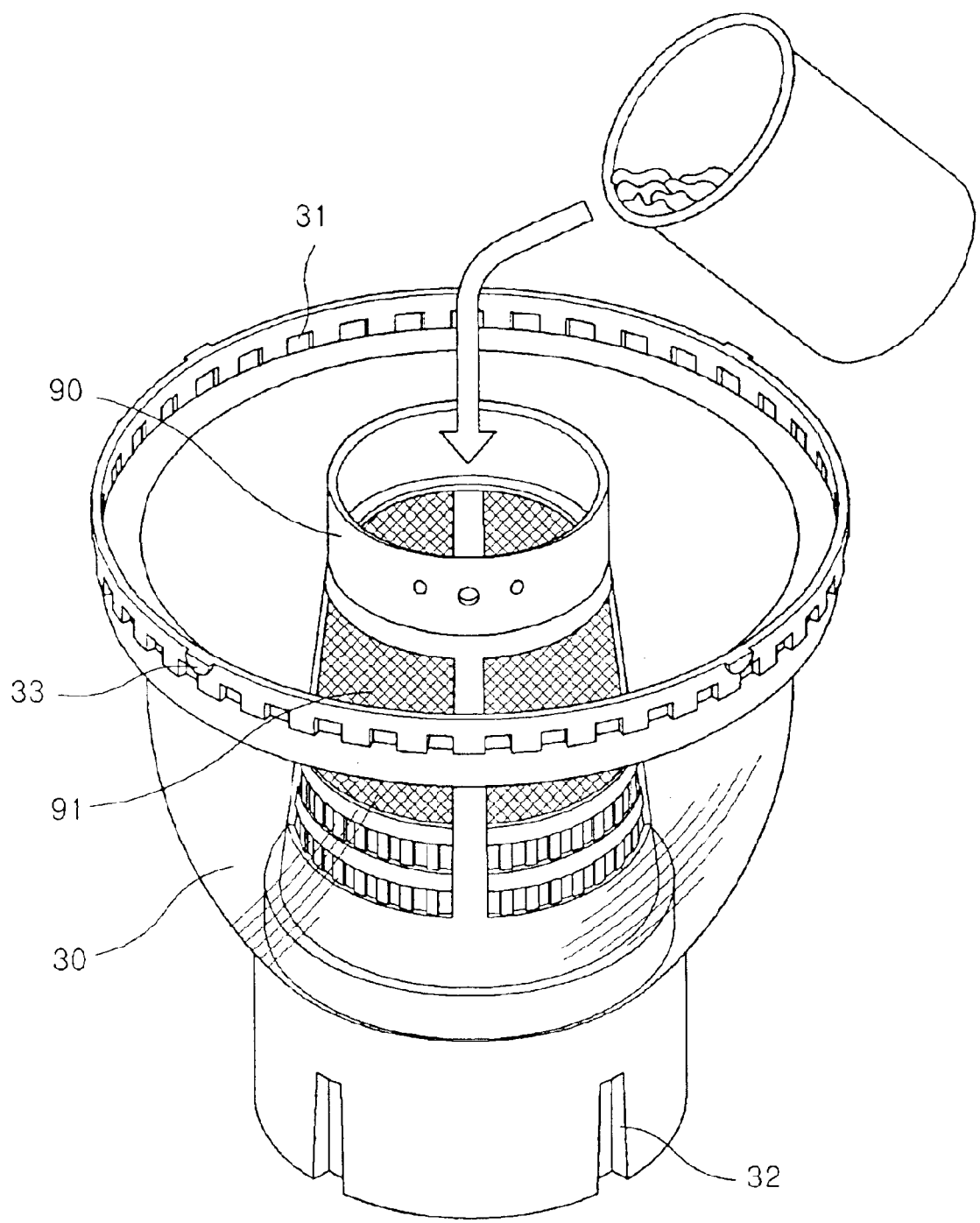
FIG. 7 is a perspective view illustrating a bean supplying process into a grinding container according to the present invention.

As shown in FIGS. 2, 6 and 7, the grinding container 90 is removably inserted in the rotational container 30 to make the bean juice by grinding the beans contained therein, to filter out the residues contained in the bean juice, and to dispense the bean juice to the rotational container 30. The grinding container 90 is formed in a tapered shape having a wide lower portion and a narrow upper portion. The grinding container 90 has an opened top and an opened bottom.

The opened bottom of the grinding container 90 is fixed on the bottom of the rotational container 30, and the grinding blade 40 is inserted into the grinding container through the opened bottom of the grinding container 90.

The opened top of the grinding container 90 functions to allow the user to input beans and water into the grinding container 90.

Installed on a side portion of the grinding container 90 is a filtering net 91 for firstly filtering out the residue contained in the bean juice and for dispensing the filtered bean juice to the rotational container 30. Each aperture of the filtering net 91 is formed in an oval-shape having a longitudinal axis of, for example, 1.8–2.2 mm and a lateral axis of, for example, 0.4–0.6 mm so that the bean juice including bean particles having a proper size can be dispensed. Preferably, the lengths of the longitudinal and lateral axes are about respectively 2 mm and 0.5 mm.

When the size of the aperture is greater than 2.2 mm×0.6 mm, there is a possibility that large-sized particles may pass through the filtering net 91, and when the size of the aperture is less than 1.8 mm×0.4 mm, the bean particles may not sufficiently pass through the filtering net 91, making it difficult to obtain a tasty bean curd due to the watery bean juice.

Meanwhile, formed on a lower portion of the grinding container 90 are a plurality of intake holes 92 through which the external water is directed into the grinding container 90 when a rising eddy is generated by the rotation of the grinding blade 40.

As shown in FIGS. 2 and 9, the bean juice guide 100 is disposed enclosing the upper portion of the rotational container 30 in the grinding chamber 11 of the main body 10 to guide the bean juice dispensed from the rotational container 30 to the heating container 130. The bean juice guide 100 is formed in a ring-shape and is provided at an inner circumference with a valley 101 in which the bean juice dispensed from the rotational container 30 stays. That is, the valley 101 is inclined in a predetermined direction such that the bean juice dispensed from the rotational container 30 is first collected in the valley 101 and is then dispensed to the heating container 130.

The bean juice exhausting channel 102 extends from a portion of the bean juice guide 100 to direct the bean juice collected in the valley 101 toward the heating container 130. The bean exhausting channel 102 passes through the dispensing through hole 17 formed on the main body 10.

Figure 10:
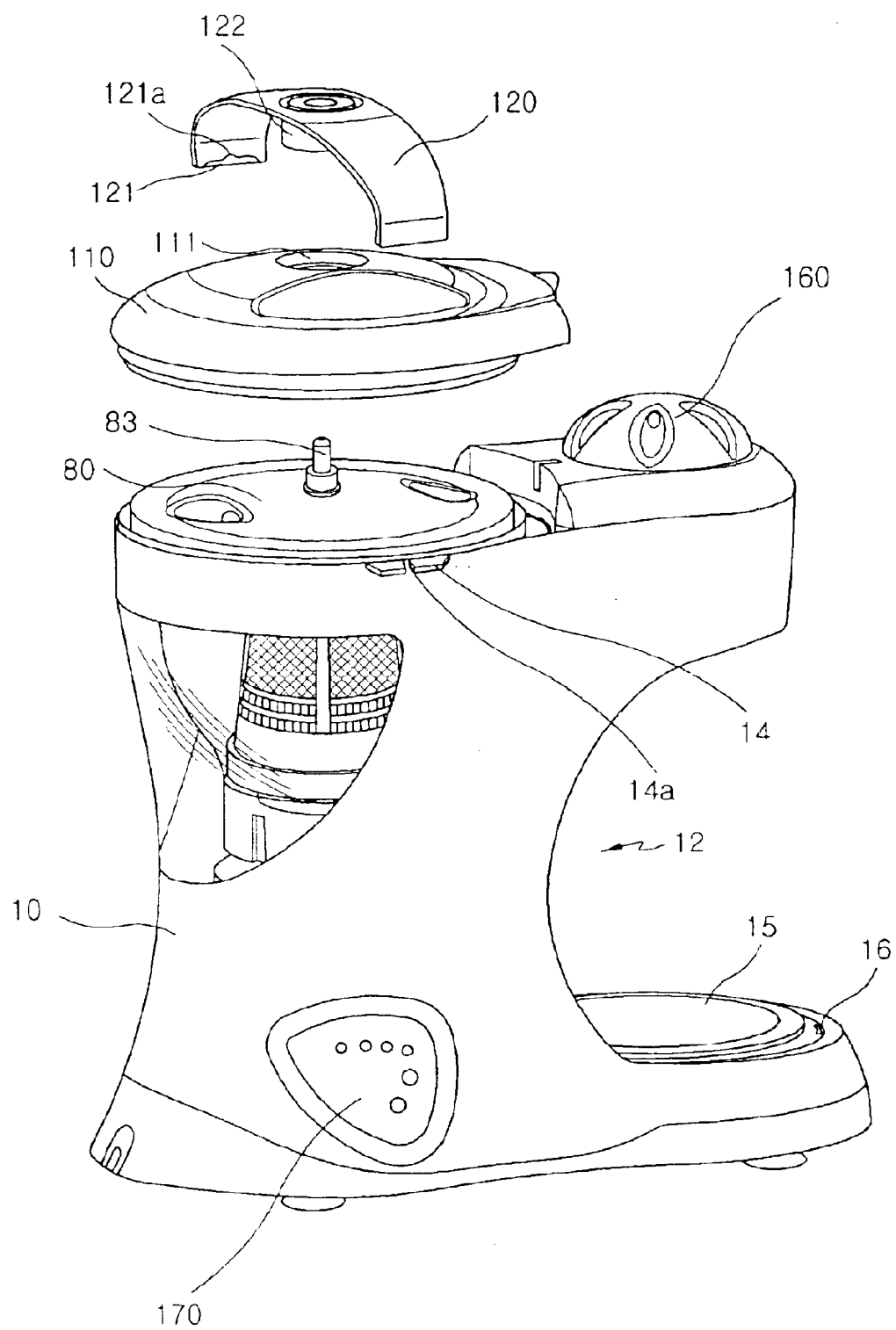
FIG. 10 is a perspective view illustrating an assembling process of an upper cover with a fixing member.

As shown in FIGS. 2 and 10, the rotational container fixing means is removably fixed on the entrance of the grinding chamber 11 of the main body 10 to prevent the rotational container 30 from seceding from the grinding chamber 11 and to rotatably support the rotational container 30. The rotational container fixing means comprises an upper cover 110 for closing the entrance of the grinding chamber 11 of the main body 10 and a fixing member 120 having opposite ends removably fixed on the entrance of the grinding chamber 11 of the main body 10 to fix the upper cover 110. The rotational pin 83 penetrates the upper cover 110, The upper cover 110 is provided at a central portion with a through hole 111 through which the rotational pin 83 is inserted. The through hole 111 is provided at an inner lower portion with a fixing member seating step 11a on which the fixing member 120 is seated.

The fixing member 120 is formed in an arch-shape. Formed on opposite inner ends of the fixing member 120 are fixing hooks 121 to be hooked onto the hook member 14 of the main body 10. Fixing projections 121a are formed on centers of the fixing hooks 121, the fixing projections 121a being inserted in the hook grooves 15a of the hook members 14 when the fixing hooks 121 are hooked on the hook member 14.

A rotational shaft 122 is extended downward from the central portion of the fixing member 120 and rotatably seated on the seating step 11a after being inserted into the through hole 111 of the upper cover 110, thereby defining a rotational center of the fixing member 120. The rotational shaft 122 is provided at a central portion with an insertion groove 122a opened downward. The rotational pin 83 is rotatably inserted into the insertion groove 122a.

As shown in FIG. 2, the heating container 130 is removably inserted in the heating chamber 12 of the main body 10. The heating container 130 has an opened top through which the bean juice is supplied. A handle 131 is mounted on a side portion of the heating container 130. A dispensing groove 132 for dispensing the heated bean juice to an external portion is formed on a portion of the opened top at a side portion opposite to that where the handle 131 is formed.

The heating container 130 is provided at an outer bottom with a plurality of secession preventing projections 133 (FIG. 1) inserted into the secession prevention grooves 16 formed around the heating plate 15 of the heating chamber 12.

As shown in FIG. 2, the heating container cover 140 functions to close the opened top of the heating container 130. The cover 140 is provided at a bottom with a ring-shaped fixing part 141 for fixing the filtering container 150. Water level measuring bars 142 for measuring a level of the bean juice stored in the heating container 130 are installed on the bottom of the cover 140 inside the ring-shaped fixing part 141.

The fixing part 141 is provided at an outer side with a plurality of fixing grooves 143 associated with fixing projections 151 of the filtering container 150.

Therefore, when the user rotates the filtering container 150 in a state where the opened top of the filtering container 150 is inserted around the fixing part 141, the fixing projections 151 are engaged with the fixing grooves 143, thereby fixing the filtering container 150 on the fixing part 141, The heating container cover 140 is further provided with a guide channel 144 for effectively directing the bean juice into the filtering container 150.

The heating container cover 140 is provided at a top center with cover contacts 145 electrically connected with the water level measuring bars 142.

As shown in FIG. 2, the filtering container 150 is removably fixed on the fixing part 141 of the heating container cover 140 functions to filter out residue contained in the bean juice dispensed through the guide channel 144 before the bean juice is externally dispensed. The fixing projections 151 formed on an upper inner side of the filtering container 150 are associated with the fixing grooves 143 of the heating container cover. Installed on a side portion of the filtering container 150 is a filtering net 152 for filtering out the residues contained in the bean juice. Since each aperture of the filtering net 152 has a size less than that of the filtering net 91 formed on the grinding container 90, the bean juice can be finely filtered.

Accordingly, the protein-rich bean juice dispensed from the grinding container 90 is further directed into the heating container 130. The bean juice directed into the heating container 130 is heated so that protein can be sufficiently dissolved in the water. Therefore, the bean juice coming through the filtering container 150 becomes tasty.

Each aperture of the filtering net 152 installed on a side portion of the filtering container 150 is formed in a circular-shape. The bean juice is most tasty when a diameter of each aperture is, for example, 0.18–0.22 mm.

When the diameter of the aperture of the filtering net 152 is higher than 0.22 mm, bean particles that are not fully dissolved may be contained in the bean juice coming through the filtering net 152, thereby deteriorating the taste and causing a rough feeling in the mouth. When the diameter of the aperture is less than 0.18 mm, since the minute bean particles are filtered, the bean juice becomes watery.

Figure 4:
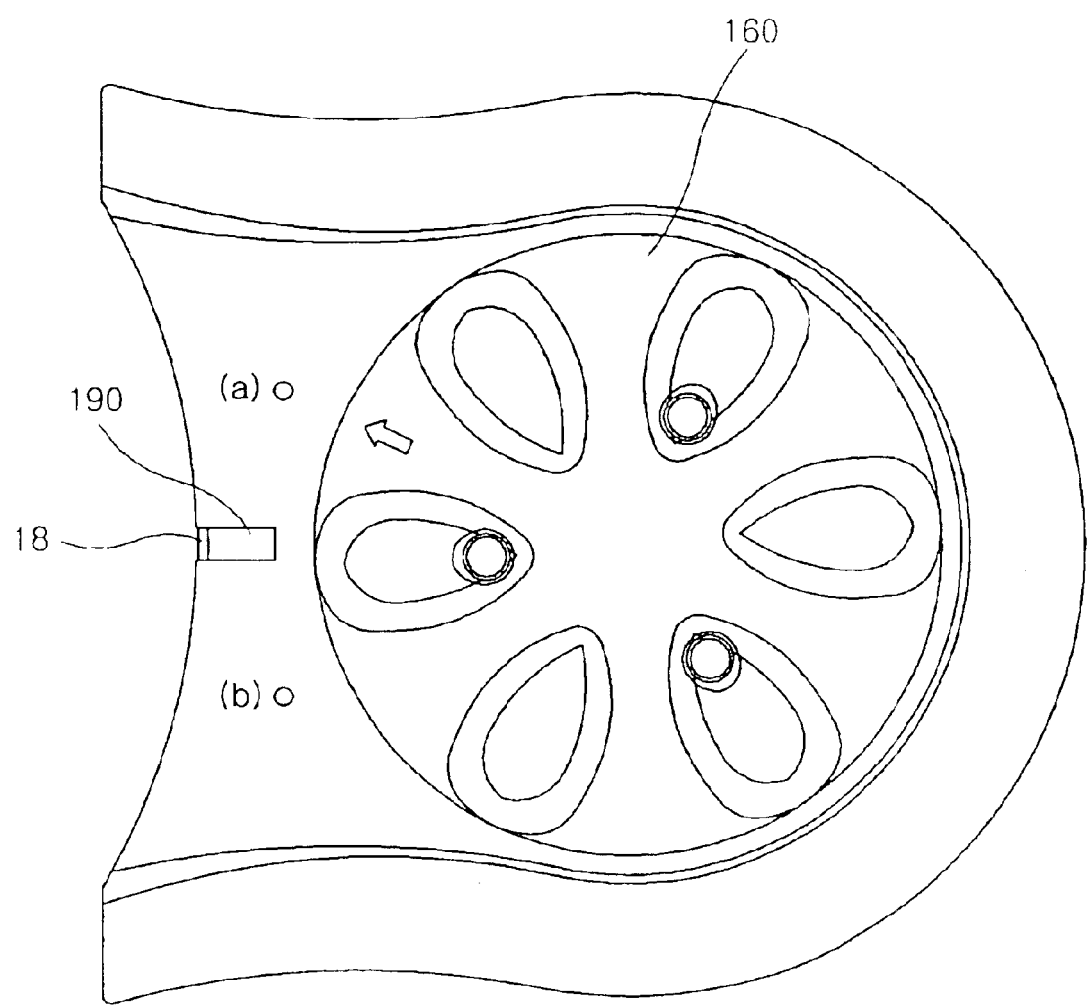
FIG. 4 is a plane view of an operation start handle depicted in FIGS. 1 and 2.

As shown in FIGS. 2 and 4, the operation start handle 160 is rotatably installed on a top of the heating chamber 12 so as to lock the heating container 130, thereby preventing the heating container 130 inserted in the heating chamber 12 from seceding or moving and thereby allowing for the grinding and heating operation. As shown in FIG. 4, when the operation start handle 160 rotates counterclockwise in the drawing so that the arrow points to the "(b)" in FIG. 4, the heating container 130 is locked.

Figure 3:
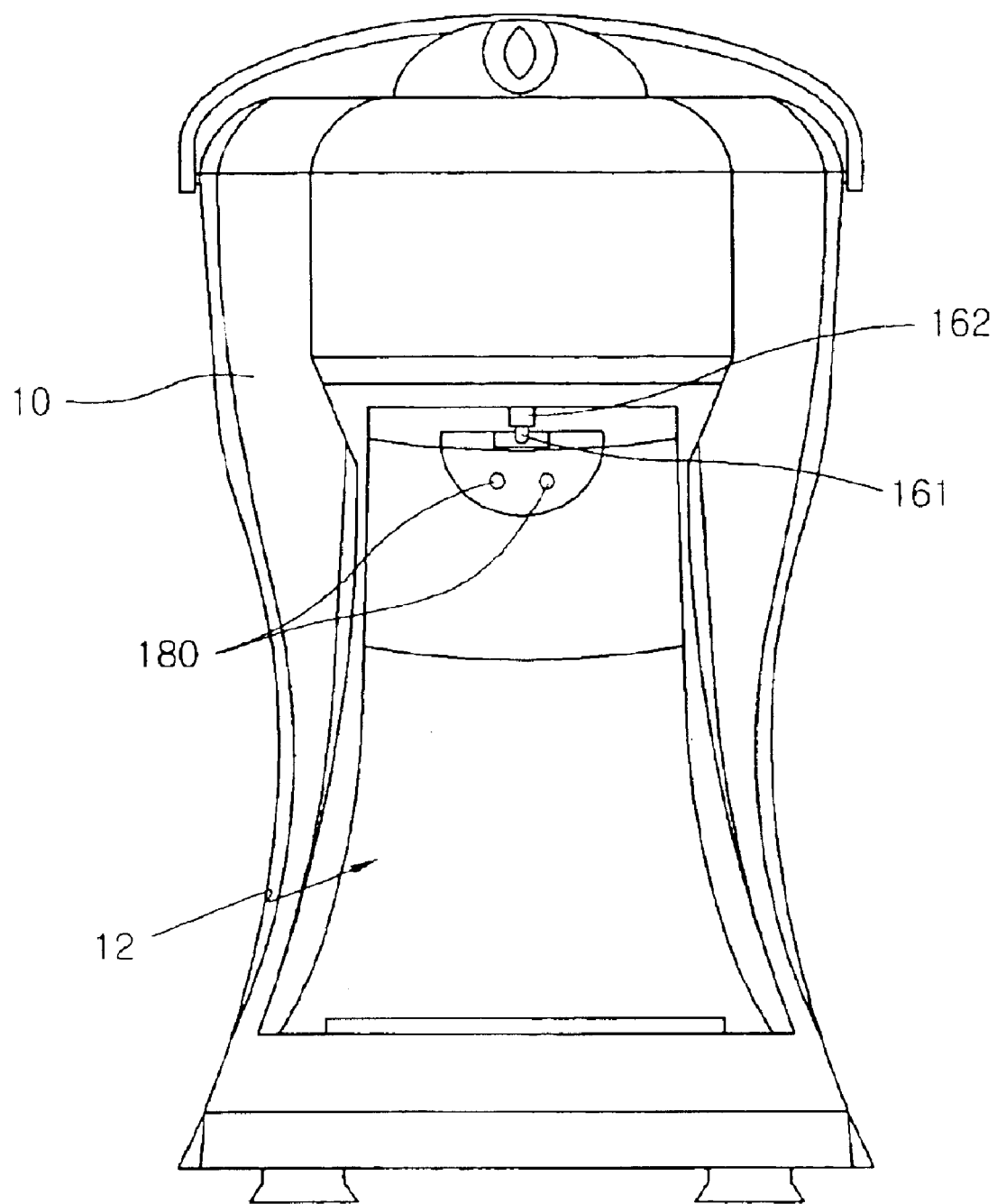
FIG. 3 is a side view of a main body depicted in FIGS. 1 and 2.

As shown in FIG. 3, a handle contact 161 electrically contacting the cover contacts 145 of the heating container cover 140 is installed on a bottom of the operation start handle 160 (FIG. 4). The handle contact 161 is deigned to be vertically movable by an elevating shaft 162.

When the operation start handle 160 rotates counterclockwise such that the handle contact 161 descends by the elevating shaft 162 to contact the cover contact 145 of the cover 140, the water level measuring bar 142 electrically contacts the control circuit 60.

As shown in FIGS. 1 and 2, a front panel 170 is installed on a front portion of the main body 10 to control each member. The control panel 170 comprises a mode selecting button 171 by which a variety of operation modes such as a manufacturing mode according to a state of beans, a grinding mode, a centrifugal separating mode, and a heating mode can be selected, an on/off button 172 for driving or stopping the driving motor 20 and the heating plate 14 after a mode is selected by the mode selecting button 171, and a plurality of LEDs 173, 174,. 175, and 176 for letting the user identify if a desired mode is correctly selected.

Figure 5:
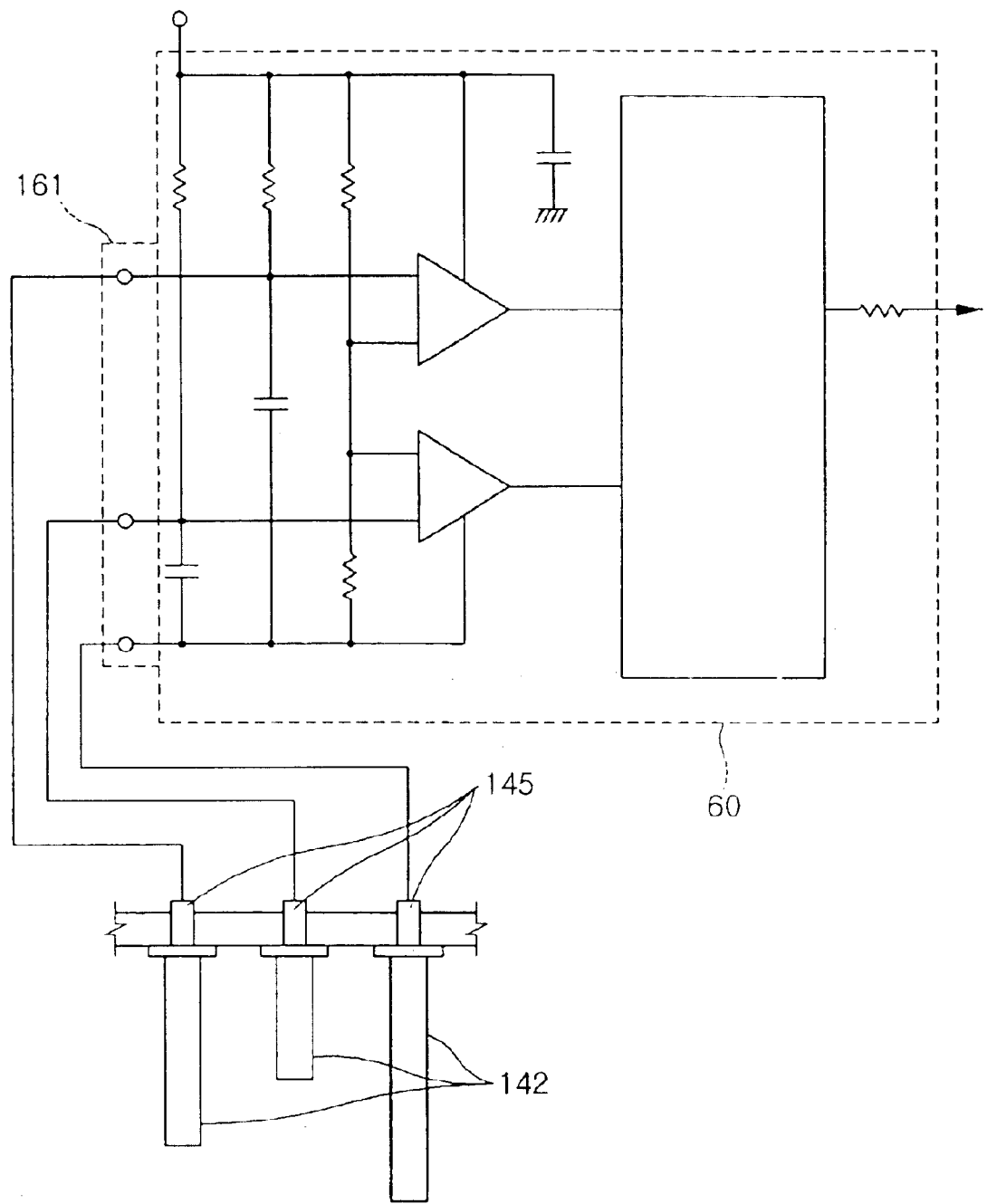
FIG. 5 is a circuit diagram of a control circuit of an automatic bean curd manufacturing apparatus according to a preferred embodiment of the present invention.

The control panel 170 is electrically connected to the control circuit 60 (FIG. 5).

The reference numeral 180 in FIG. 3 indicates a detecting sensor installed in a sidewall of the heating chamber 12 to detect the bean juice overflowing the dispensing groove 132 of the heating container 130 when the bean juice is heated in the heating container 130.

The reference numeral 190 in FIG. 4 indicates a depressing switch installed in a groove 18 (FIG. 2) formed on a portion of the entrance of the grinding chamber 11. The depress switch 190 is operated by being depressed by a projection 112 (FIG. 2) extending from the upper cover 110 when the projection 112 is correctly inserted in the groove 18.

That is, only when the upper cover 110 is correctly installed by the depress switch 190 depressed by projection 112 so that the driving motor 20 starts driving by the control of the control circuit 60.

The operation of the above-described automatic bean curd manufacturing apparatus will be described hereinafter.

As shown in FIG. 6, the grinding container 90 is inserted in the rotational container 30 such that the grinding blade 40 can be inserted into the grinding container 90 through the opened bottom of the grinding container 90.

At this point, the grinding container 90 should be correctly fixed. When the grinding container 90 is not correctly fixed, the grinding blade 40 may collide with the grinding container 90 during the rotation. This may cause the grinding blade 40 and the grinding container 90 to be damaged.

When the installation of the grinding container 90 is completed, as shown in FIG. 7, the soaked or dry beans are fed into the grinding container 90 through the opened top of the grinding container 90, after which a proper amount of the water is fed in the grinding container 90 up to a middle level.

Figure 8:
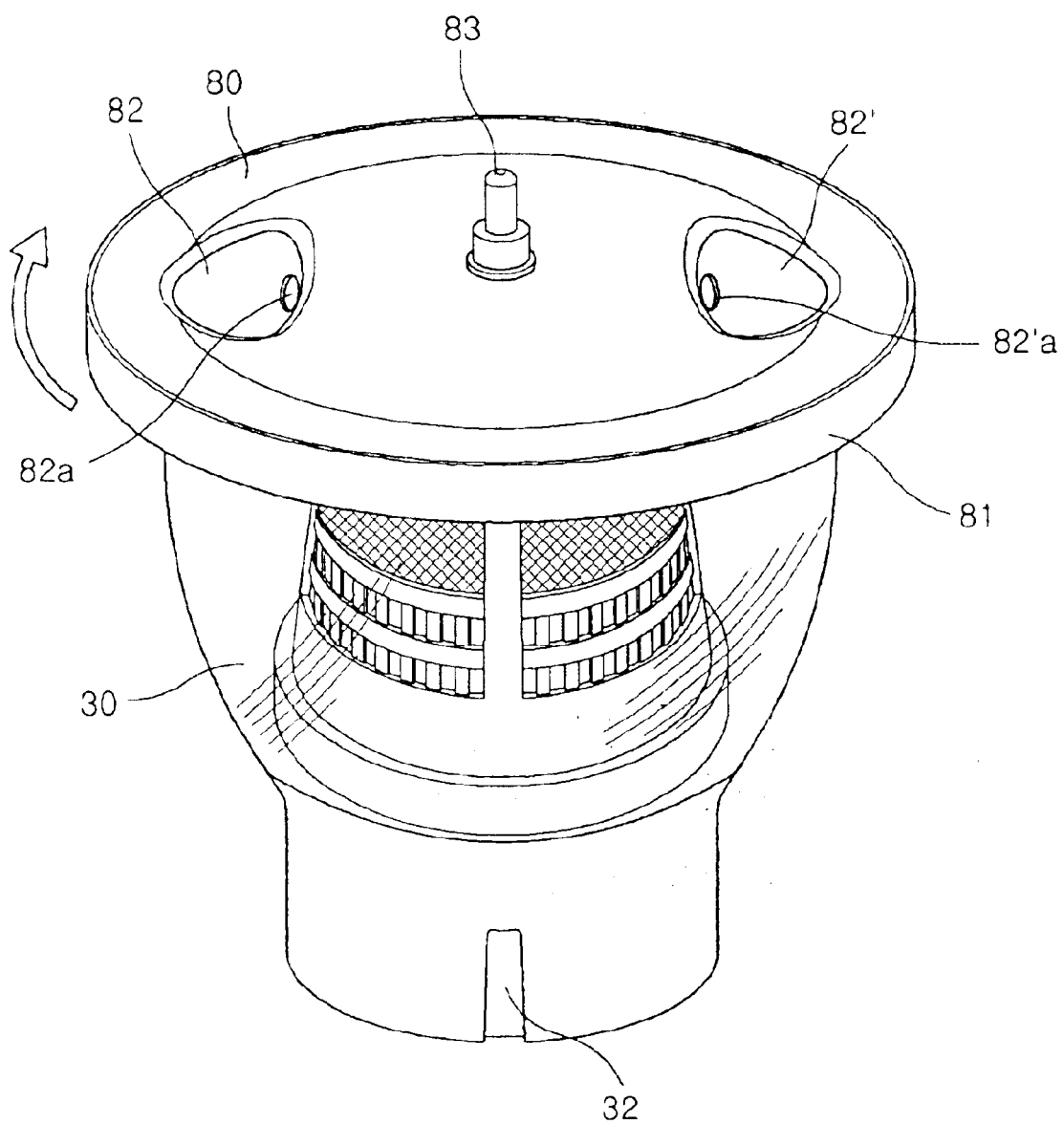
FIG. 8 is a perspective view illustrating an assembling process of a cover with a rotational container according to the present invention.

Afterwards, as shown in FIG. 8, when the rotational cover 80 is manually rotated in a state where it is seated on the opened top of the rotational container 30, the coupling projections 33 formed on the rotational container 30 are inserted in the coupling grooves of the cover 80, thereby tightly sealing the opened top of the rotational container 30.

At this point, since the beans are contained in the grinding container 90 while the water is filled in an outer space of the grinding container 90, the water may be externally leaked through the bean juice exhaust holes 31 formed on the rotational container 30 when the rotational container 30 is declined in a direction. Therefore, the rotational container 31 should maintain its horizontal level.

Afterwards, as shown in FIG. 9, the bean juice guide 100 is first inserted into the grinding chamber 11 of the main body 10 such that the bean juice exhausting channel 102 is inserted in the dispensing through hole 17 formed between the grinding chamber 11 and the heating chamber 12.

When the rotational container 30 is inserted in the grinding chamber 11 such that the second coupling 41 of the grinding blade 40 is engaged with the first coupling 21 of the driving motor 20, the bean juice exhaust holes 31 are located corresponding to the valley 101 of the bean juice guide 100.

When the installation of the rotational container 30 and the bean juice guide 100 is completed, as shown in FIG. 10, the upper cover 110 and the fixing member 120 are installed on the entrance of the grinding chamber 11. At this point, the rotational pin 83 of the rotational container cover 80 passes through the through hole 111 of the upper cover 110 and the rotational shaft 122 is inserted in the through hole 111 in order for the rotational pin 83 to be inserted in the insertion groove 122a of the fixing member 120, after which, when the fixing member 120 is rotated while being depressed, the fixing hooks 121 are hooked on the hook members 14 of the main body 10.

At this point, the fixing process is completed only when the fixing projections 121 a are fully inserted in the hook grooves 14a formed on the hook members 14.

In the course of the above process, when the projection 112 of the upper cover 110 is not fully inserted in the groove 18 of the main body, since the depress switch 190 is not operated, the user cannot operate the bean curd manufacturing apparatus.

When the rotational container 30, the grinding container 90 and the rotational container fixing means are assembled in this order in the grinding chamber 11 of the main body 10, the heating container 130 is inserted in the heating chamber 12 of the main body 10.

At this point, before the heating container 130 is inserted in the heating chamber 12, the heating container cover 140 is fixed on the opened top of the heating container 130 in a state where the filtering container 150 is fixed on the fixing part 141 formed on the bottom of the heating container cover 140.

After the heating container 130 is disposed on the heating plate 15 of the heating chamber 12, when the operation start handle 160 is rotated counterclockwise in FIG. 4 such that the arrow corresponds to the "(b)" in FIG. 4 (i.e., to the operation start location), the cover contact 145 installed on the top of the heating container cover 140 is connected with the handle contact 161 installed on the operation start handle 160. As a result, as shown in FIG. 5, the water level measuring bars 142 are electrically connected to the control circuit 60, thereby completing the operating preparation.

When the operating preparation is completed, the user selects an operation mode such as a manufacturing mode according to a state of beans, a grinding mode, a centrifugal separating mode, or a heating mode using the mode selecting button 171. Only a single operation mode can be selected and independently performed, or all of the operations modes can be selected and consecutively performed.

The latter will be described hereinafter.

That is, when the user selects the operation mode using the mode selecting button 171 and turns on the on/off button 172, the operation shaft 51 is projected out of the solenoid 50 by the control of the control circuit 60 and is then inserted in the insertion groove 32 of the rotational container 30, thereby suppressing the rotation of the rotational container 30.

Afterwards, the driving motor 20 rotates in a grinding direction such that the second coupling 41 coupled on the first coupling 21 is rotated to rotate the grinding blade 40.

At this point, the grinding blade 40 rotates while overcoming the frictional force between the grinding blade 40 and the clutch 70 to grind the beans contained in the grinding container 90.

The beans are ground into particles that can pass through the filtering net 91, in the course of which the rising eddy is generated by the rotation of the grinding blade 40. By the rising eddy, the external water is sucked into the grinding container 90 through the intake holes 92 formed on the lower portion of the grinding container 90. The sucked water is mixed with the bean particles to create a bean juice. The bean juice is exhausted through the filtering net 91. The residue filtered by the filtering net 91 is further ground by the grinding blade 40.

After a predetermined grinding time is elapsed, the bean residue filtered by the filtering net remains in the grinding container 90. That is, only the bean juice is exhausted through the filtering net 91.

In addition, as the operation shaft 51 of the solenoid 50 is released from the insertion groove 32 of the rotational container 30 by the control of the control circuit 60, the rotational container 30 and the grinding blade 40 are simultaneously rotated by the frictional force between the clutch 70 and the grinding blade 40.

When the rotational container 30 is rotated, the bean juice contained in the rotational container 30 ascends along an inclined surface of the rotational container 30 by the centrifugal force and is then directed to the valley 101 of the bean juice guide 100 through the bean juice exhaust holes 31 formed on the upper portion of the rotational container 30.

The bean juice directed to the valley 101 of the bean juice guide 100 is dispensed to the heating container 130 along the bean juice exhaust channel 102. At this point, the bean juice exhausted through the exhaust channel 102 is guided to the filtering container 150 by the guide channel 144 of the heating container cover 140.

The bean juice dispensed into the filtering container 150 is exhausted through the filtering net 152, in the course of which the bean juice level in the filtering container 150 and the bean juice level outside the filtering container 150 are simultaneously, increased while maintaining an identical level.

When the bean juice level is increased to a predetermined level, the level measuring bar 142 detects it and transmits a detecting signal to the control circuit 60 through the cover contact 145 of the heating container cover 140 and the handle contact 161 of the operation start handle 160 so that the operation of the driving motor 20 is stopped by the control of the control circuit 60, whereby the rotation of the rotational container 30 and the grinding blade 40 is automatically stopped.

When the dispensing of the bean juice toward the heating container 130 is completed, the heater disposed under the heating plate 15 is operated by the control of the control circuit 60 to generate heat on the heating plate 15. The heat is transmitted to the heating container 130 to heat the bean juice.

In the course of heating the bean juice, the bean juice is converted into soymilk. At this point, to prevent the soymilk from boiling over, the level measuring bar 142 measures the level to control the heating temperature.

When the bean juice is heated for a predetermined time under the control of the control circuit 60, the soymilk used for manufacturing bean curd is obtained. The user can, according to his/her liking, drink the soymilk as it is or make an uncurdled bean curd, a soft bean curd, or a normal bean curd by adding a coagulant to the soymilk.

As described above, according to the automatic bean curd manufacturing apparatus, since a bean juice extracting process for extracting a bean juice by grinding the beans and a soymilk forming process for forming soymilk by heating the extracted bean juice are automatically and consecutively performed, it is possible for a user to easily make the soymilk or a bean curd at home and instantly eat the same. That is, the user can consume fresh soymilk or bean curd. Furthermore, in certain circumstances, in order to obtain a specific effect, a functional bean curd can be made by adding a variety of supplementary foodstuffs to the bean curd according to the liking of the user.

Particularly, the beans are ground by the grinding blade installed in the rotational container, and the bean juice is externally dispensed by the rotation of the rotational container after the bean juice obtained by grinding the beans passes through the grinding container installed in the rotational container. That is, the grinding and dispensing processes are realized in a single rotational container, thereby saving the manufacturing time and reducing the volume of the apparatus.

Furthermore, since the bean juice obtained by grinding the beans passes through the grinding container having a plurality of apertures each having a relatively large size, the protein-rich bean juice can be dispensed to the heating container. The bean juice dispensed to the heating container is heated in the heating container and is filtered again by the filtering container having a plurality of apertures each having a relatively small size. As a result, tasty, soft-to-drink soymilk can be obtained.

Since each element is operated only when the heating container is locked by the operation start handle in order for the heating container not to move in the course of the heating process, an inadvertent accident can be prevented and the bean juice can be correctly dispensed from the rotational container to the heating container.

Meanwhile, since the bean juice level contained in the heating container is measured by the level measuring bar and the dispensing of the bean juice into the heating container is automatically stopped when the level is higher than a predetermined level, the bean juice boiling over is prevented.

It will be apparent to those skilled in the art that various modifications and variations can be made in the present invention. Thus, it is intended that the present invention covers the modifications and variations of this invention provided they come within the scope of the appended claims and their equivalents.

What is claimed:

1. An automatic bean curd manufacturing apparatus comprising:
   a main body provided with a bean grinding chamber and a bean juice heating chamber;
   a driving motor installed in the main body;
   a rotational container removably and rotatably installed in the grinding chamber of the main body and provided at an inner bottom with a grinding blade;
   rotation suppressing means for selectively suppressing a rotation of the rotational container, the rotation suppressing means being installed in the grinding chamber;
   a clutch installed on a bottom of the rotational container to rotatably support the grinding blade, the clutch allowing only the grinding blade to rotate when the rotation of the rotational container is suppressed by the rotation suppressing means and allowing both the rotational container and the grinding blade to simultaneously rotate when the rotation of the rotational container is not suppressed by the rotation suppressing means;
   a rotational container cover for closing an opened top of the rotational container;
   a grinding container removably installed in the rotational container to grind the beans, the grinding blade installed on the bottom of the rotational container being located in the grinding container;
   rotational container fixing means for preventing the rotational container from moving while rotatably supporting the rotational container, the rotational container fixing means being installed on an entrance of the grinding chamber of the main body;
   a heating container removably installed in the heating chamber to heat the bean juice dispensed from the rotational container through a bean juice guide; and
   a heating container cover for closing an opened top of the heating container.

2. The automatic bean curd manufacturing apparatus according to claim 1, wherein the rotational container is provided at an upper portion with a plurality of bean juice exhausting holes spaced away from each other, through which the bean juice ascended in the rotational container by centrifugal force generated when the rotational container rotates is exhausted to an external side.

3. The automatic bean curd manufacturing apparatus according to claim 2, further comprising a bean juice guideencloses the upper portion of the rotational container in the grinding chamber to guide the bean juice dispensed from the rotational container to the heating container.

4. The automatic bean curd manufacturing apparatus according to claim 3, wherein the bean juice guide is provided at an inner circumference with a valley in which the bean juice dispensed from the rotational container stays and a bean juice exhausting channel extends from a portion of the bean juice guide to direct the bean juice collected in the valley to an external side.

5. The automatic bean curd manufacturing apparatus according to claim 1, wherein the rotation suppressing means comprises a solenoid, and the rotational container is provided at a lower-outer side with an operation shaft insertion groove in which an operation shaft of the solenoid is inserted to suppress the rotation of the rotational container.

6. The automatic bean curd manufacturing apparatus according to claim 1 further comprising a filtering container for filtering off residue from the bean juice dispensed and heated in the heating container, the filtering container being removably coupled on a bottom of the heating container cover.

7. The automatic bean curd manufacturing apparatus according to claim 6, wherein the heating container cover is provided at the bottom with a ring-shaped fixing part for removably fixing the filtering container.

8. The automatic bean curd manufacturing apparatus according to claim 7, wherein a guide for guiding the bean juice dispensed from the rotational container into the filtering container extends from the heating container cover.

9. The automatic bean curd manufacturing apparatus according to claim 6, wherein the filtering container is provided with a plurality of circular-shaped apertures each having a diameter of between about 0.08–0.22 mm.

10. The automatic bean curd manufacturing apparatus according to claim 1 further comprising: a water level measuring bar for measuring a bean juice level in the heating container, the water level measuring bar being mounted on a bottom of the heating container cover.

11. The automatic bean curd manufacturing apparatus according to claim 10 further comprising an operation start handle for locking the heating container inserted in the heating chamber, the operation start handle being mounted on a top of the main body.

12. The automatic bean curd manufacturing apparatus according to claim 11 further comprising an elevating shaft installed on a bottom of the operation start handle and a contact installed on the elevating shaft, wherein the contact is electrically connected with the water level measuring bar when the elevating shaft descends.

13. The automatic bean curd manufacturing apparatus according to claim 1 further comprising: a rotational pin installed on a central portion of the rotational container cover and rotatably supported on the rotational container fixing means.

14. The automatic bean curd manufacturing apparatus according to claim 13, wherein the rotational shaft fixing means comprises:
  an upper cover for closing an entrance of the grinding chamber, the rotational pin penetrating the upper cover; and
  a fixing member having a central portion rotatably seated on a central portion of the upper cover and opposite ends removably fixed on the entrance of the grinding chamber to fix the upper cover, wherein the rotational pin penetrating the upper cover is rotatably inserted in the central portion of the fixing member.

15. The bean curd manufacturing apparatus of claim 1, further comprising a heating plate installed on a bottom of the heating chamber.

16. The automatic bean curd manufacturing apparatus of claim 1 wherein the grinding container has a plurality of oval-shaped apertures each having a longitudinal axis of between about 1.8–2.2 mm and a lateral axis of between about 0.4–0.6 mm.

17. An automatic bean curd manufacturing apparatus comprising:
  a main body provided with a bean grinding chamber and a bean juice heating chamber;
  a rotational container removably and rotatably installed in the grinding chamber of the main body and provided at an inner bottom with a grinding blade;
  rotation suppressing means for selectively suppressing a rotation of the rotational container, the rotation suppressing means being installed in the grinding chamber;
  a clutch installed on a bottom of the rotational container to rotatably support the grinding blade, the clutch allowing only the grinding blade to rotate when the rotation of the rotational container is suppressed by the rotation suppressing means and allowing both the rotational container and the grinding blade to simultaneously rotate when the rotation of the rotational container is not suppressed by the rotation suppressing means;
  a grinding container removably installed in the rotational container to grind the beans, the grinding blade installed on the bottom of the rotational container being located in the grinding container; and
  a heating container removably installed in the heating chamber to heat the bean juice dispensed from the rotational container through a bean juice guide.

18. The automatic bean curd manufacturing apparatus according to claim 17, wherein the rotational container is provided at an upper portion with a plurality of bean juice exhausting holes spaced away from each other, through which the bean juice ascended in the rotational container by centrifugal force generated when the rotational container rotates is exhausted to an external side.

19. The automatic bean curd manufacturing apparatus according to claim 17, further comprising a filtering container for filtering off residue from the bean juice dispensed and heated in the heating container, the filtering container being removably coupled on a bottom of the heating container cover.

20. The automatic bean curd manufacturing apparatus according to claim 19, wherein the filtering container is provided with a plurality of circular-shaped apertures each having a diameter of between about 0.08–0.22 mm.

* * * * *